US012746855B2

(12) United States Patent
Herrmann et al.

(10) Patent No.: US 12,746,855 B2
(45) Date of Patent: Sep. 29, 2026

(54) ADJUSTMENT SYSTEM AND METHOD FOR ROUGH AND PRECISE ADJUSTMENT

(71) Applicant: BROSE FAHRZEUGTEILE SE & CO. KOMMANDITGESELLSCHAFT, BAMBERG, Bamberg (DE)

(72) Inventors: Christian Herrmann, Grossheirath (DE); Peter Horn, Kemmern (DE); Matthias Gempel, Bamberg (DE); Christopher Trenkle, Bamberg (DE); Hans Bauer, Bamberg (DE); Jasmin Pfeufer, Schesslitz (DE); Timo Witzel, Flieden (DE); Thomas Weingärtner, Lichteneiche (DE)

(73) Assignee: BROSE FAHRZEUGTEILE SE & CO. KOMMANDITGESELLSCHAFT, BAMBERG, Bamberg (DE)

( * ) Notice: Subject to any disclaimer, the term of this patent is extended or adjusted under 35 U.S.C. 154(b) by 211 days.

(21) Appl. No.: 18/575,752

(22) PCT Filed: Jun. 30, 2022

(86) PCT No.: PCT/EP2022/068050
§ 371 (c)(1),
(2) Date: Feb. 5, 2024

(87) PCT Pub. No.: WO2023/275238
PCT Pub. Date: Jan. 5, 2023

(65) Prior Publication Data

US 2025/0074258 A1 Mar. 6, 2025

(30) Foreign Application Priority Data

Jul. 2, 2021 (DE) ..................... 10 2021 117 149.0

(51) Int. Cl.
*B60N 2/02* (2006.01)
*B60N 2/18* (2006.01)
*B60N 2/22* (2006.01)

(52) U.S. Cl.
CPC ....... *B60N 2/0248* (2013.01); *B60N 2/02246* (2023.08); *B60N 2/0273* (2023.08); *B60N 2/18* (2013.01); *B60N 2/22* (2013.01)

(58) Field of Classification Search
None
See application file for complete search history.

(56) References Cited

U.S. PATENT DOCUMENTS 5,003,240 A 3/1991 Ikeda
10,399,463 B2 * 9/2019 Sugiyama ............ B60N 2/0244
(Continued)

FOREIGN PATENT DOCUMENTS

DE 4034558 A1 5/1992
DE 19630188 A1 1/1998
(Continued)

OTHER PUBLICATIONS

ISA European Patent Office, International Search Report Issued in Application No. PCT/EP2022/068050, Sep. 27, 2022, WIPO, 3 pages.

*Primary Examiner* — Lail A Kleinman
(74) *Attorney, Agent, or Firm* — McCoy Russell LLP

(57) ABSTRACT

It is provided an adjustment system for adjusting an interior object in a vehicle interior, comprising at least—an adjustment apparatus for adjusting the interior object by means of external force and—control electronics for controlling the adjustment of the interior object by means of external force during an adjustment process starting from an initial position into a target position of the interior object. The control electronics are further designed to control the adjustment apparatus for the adjustment process in a first adjustment
(Continued)

range for a rough adjustment of the interior object and in a subsequent second adjustment range from an intermediate position until the target position is reached for a precise adjustment.

15 Claims, 1 Drawing Sheet

(56) References Cited

U.S. PATENT DOCUMENTS

| | | | | |
|---|---|---|---|---|
| 2016/0090055 | A1 | 3/2016 | Breed | |
| 2019/0160974 | A1* | 5/2019 | Ohmura | B60N 2/0252 |
| 2023/0242012 | A1* | 8/2023 | Vignola | B60N 2/66 701/49 |

FOREIGN PATENT DOCUMENTS

| | | | |
|---|---|---|---|
| DE | 102005034410 | A1 | 3/2006 |
| DE | 102018124201 | A1 | 4/2020 |
| WO | 2005036293 | A1 | 4/2005 |

* cited by examiner

ADJUSTMENT SYSTEM AND METHOD FOR ROUGH AND PRECISE ADJUSTMENT

CROSS REFERENCE TO RELATED APPLICATIONS

The present application is a U.S. National Phase of International Application No. PCT/EP2022/068050 entitled "ADJUSTMENT SYSTEM AND METHOD HAVING ROUGH AND PRECISE ADJUSTMENT," and filed on Jun. 30, 2022. International Application No. PCT/EP2022/068050 claims priority to German Patent Application No. 10 2021 117 149.0 filed on Jul. 2, 2021. The entire contents of each of the above-listed applications are hereby incorporated by reference for all purposes.

BACKGROUND

The proposed solution relates in particular to an adjustment system for adjusting an interior object in a vehicle interior.

The adjustment of interior objects of a vehicle interior using an adjustment device comprising at least one drive motor is widely known. For example, vehicle seats, central consoles, tables, through-chargers and similar interior objects in a vehicle interior are already adjusted in an electronically controlled manner. In this case, it is also known to adjust individual or a plurality of interior objects in groups within the context of what is known as an adjustment scenario, in order to arrange interior objects in the vehicle interior in a specific manner relative to one another. In particular as part of the conceivable possibility of at least partially autonomous driving of vehicles, a variable interior design will gain importance. This is reflected in particular in a need for interior objects that can be arranged in a more flexible manner. However, if different, in particular user-specific, adjustment possibilities for different interior objects in a vehicle interior are granted, it is likely to become increasingly important, for the sense of comfort of a vehicle occupant, for a plurality of different target positions of an interior object to be assumed in a comparatively short time, but in the process still in an extremely precise manner.

SUMMARY

Against this background, the proposed solution inter alia provides an adjustment system in which control electronics is configured for controlling an adjustment of an interior object, actuated by external power, using an adjustment device, to actuate the adjustment device for an adjustment process, in order to adjust an interior object proceeding from a starting position into a target position, in a first adjustment range for a rough adjustment of the interior object, and in a following second adjustment range, from an intermediate position until reaching the target position, for a precise adjustment.

The basic concept of the proposed solution is therefore to perform a rough adjustment of the interior object during a first adjustment phase of an adjustment process, and an associated first adjustment range, which is then followed by a precise adjustment in a temporally following second adjustment phase of the adjustment process. For example, a target position specified on the user side is then assumed via the precise adjustment. The precise adjustment can thus be user-specific, such that the target position finally assumed is dependent precisely on the precise adjustment and thus optionally on a specific user who has triggered, and thus started, an adjustment process. In contrast, a rough adjustment of the interior object can be user-independent. A rough adjustment is thus for example always carried out in the same way for an adjustment along at least one specified adjustment direction, and thus for example having a specified, invariable adjustment characteristic. This includes for example a rough adjustment having a predefined adjustment velocity. In contrast, a precise adjustment can be able to be individualized, i.e. able to be set for a specific user or a specific group of users, and thus to be variable. In this way, for example an adjustment velocity of the interior object for the precise adjustment can thus be able to be set in a variable manner, while an adjustment velocity for the rough adjustment is firmly specified in the control electronics.

In an embodiment, a rough adjustment in a first adjustment phase includes, for example, the situation that comparatively large adjustment paths, and thus distances between the starting position and the intermediate position, are bridged thereby. In the subsequent precise adjustment, for example then merely a comparatively small adjustment path and thus a comparatively short distance between the intermediate position and the desired target position is bridged in the following precise adjustment. For example, the precise adjustment then serves merely to adjust the interior object finally into the target position, by the user, or to move the interior object towards the user, up to a desired distance, and for this purpose to tweak the adjustment thereof until the target position is reached. The purposeful precise adjustment in the second adjustment phase optionally makes it possible to prevent the interior object having to be adjusted back and forth until the desired target position is reached. Instead, it is considered advantageous in this connection for the interior object to reach the target position in an electronically controlled manner, without any correction runs.

The different first and second adjustment ranges for the adjustment of the interior object are part of a single adjustment process, in order to adjust the interior object into the target position, proceeding from a starting position. As already explained above, however, different adjustment velocities can be specified in the different adjustment ranges, for the rough adjustment on the one hand and the precise adjustment on the other hand.

In principle, in the first adjustment range and in the second adjustment range, adjustments of at least one part of the interior object along the same adjustment direction can be provided. Thus, for example, at least a part of the interior object is then adjusted along a longitudinal axis and/or along a pivot direction both during the first adjustment phase and also during the second adjustment phase, but in this case initially roughly and subsequently precisely.

For example, the first adjustment range is larger than the second adjustment range. The first adjustment range thus includes for example a larger portion of an overall adjustment path to be bridged along an adjustment direction, which path has to be travelled in order to adjust the interior object proceeding from the starting position into the target position. Then for example, vice versa, only a fraction of the overall adjustment path would then fall to the precise adjustment in the second adjustment range.

In principle, the control electronics can be configured to actuate the adjustment device in the first adjustment range, during a first adjustment phase of the adjustment process, for the rough adjustment of the interior object, and in the following second adjustment range, during a temporally following second adjustment phase of the adjustment process, for the precise adjustment. In this case, the first and second adjustment phases (and optionally also further adjustment phases) can directly follow one another automatically. Therefore, no user interaction with the adjustment system is required, in order to trigger the second adjustment phase after completion of the first adjustment phase. In an alternative embodiment, however, the control electronics can also be configured, after completion of the first adjustment phase, to start the second adjustment phase only in response to an operating event triggered by a user. Consequently, there is then a time of waiting for an operating event to occur, before the second adjustment phase begins. Therefore, for example temporary stopping of the adjustment process upon reaching the intermediate position is provided, in order to give a user the possibility of purposely adapting to the further adjustment of the interior object before the start of the precise adjustment. Thus, for example, the user can check again, before the start of the second adjustment phase, whether he is correctly seated in the vehicle interior. Only then is an operating event triggered by the user, for example by a gesture and/or a voice command, in order to start the second adjustment phase.

As already explained above, the target position to be reached by the precise adjustment can be user-specific. Thus, for example, the rough adjustment can take place independently of the user, and merely the precise adjustment can be defined for exactly one user or one group of users. For this purpose, the target position is then stored for example in a memory of the control electronics, in a manner linked to a user identification. Thus, for example, a precise adjustment or the type of the precise adjustment for moving an interior object out of the intermediate position and into the target position can then also be dependent on which user was identified in the vehicle and optionally also authenticated. If the interior object is for example a vehicle seat, the type of the precise adjustment is dependent on which identified user is sitting on the vehicle seat.

In principle, the adjustment system can also be configured to receive data, relating to a target position to be reached by means of a precise adjustment, from an external memory. Thus, the adjustment system can for example comprise an interface, in order to separately receive data, wirelessly or in a wired manner, relating to a precise adjustment or a target position to be reached thereby, such that a (new) vehicle occupant can transmit their specific wishes relating to a target position or an associated precise adjustment to the adjustment system from a mobile data memory.

In this connection, the adjustment system is for example configured to receive the data relating to a target position to be reached by a precise adjustment from a mobile device of a user, and thus data relating to a target position to be reached by means of a precise adjustment can be received, in particularly purposely retrieved, by a user getting into a vehicle, such that said user can automatically be provided with their individual target position by adjusting the interior object using an embodiment of a proposed adjustment system, after getting into said vehicle. Automatic provision of data relating to at least one user-specific target position when the user gets into the vehicle can also be provided in this way.

In an embodiment, additionally at least one item of vehicle-specific and/or interior object-specific information can be stored in an external memory in which data relating to a target position to be reached by the precise adjustment are stored. Vehicle-specific information is understood, for example, to mean information relating to a specific vehicle or at least a specific vehicle type and thus in particular a specific vehicle model. An item of vehicle-specific information can thus for example include a type or model identification number for a vehicle. Analogously, interior object-specific information can include a type of the interior object and/or of the adjustment device provided therein. For example, an item of interior object-specific information for an interior object configured as a vehicle seat includes information relating to the type of sitting position (for example “getting in”, “working”, “relaxing” or “driving”) and the seat row for which the target position and the associated precise adjustment are provided.

In this case, in a possible development, the control electronics can be configured to determine the target position for the interior object to be adjusted (currently) on the basis of at least one additional item of vehicle-specific and/or interior object-specific information. Thus, the target position which is intended to be set for the user in the vehicle comprising the adjustment system is determined, by means of the control electronics, only from the data and information provided. Thus, for example, interior object-specific information for a vehicle seat can also include information, and thus data, relating to seat kinematics and to the vehicle with which the data relating to the desired target position and the associated precise adjustment were acquire and stored in the external memory. The control electronics can then convert the precise adjustments and associated adjustment parameters for a possibly differently configured seat kinematics for the vehicle seat currently to be adjusted via the adjustment system.

The proposed solution furthermore also relates to the adjustment, actuated by external power, of an interior object in a vehicle interior. In this case, it is provided that, during an adjustment process of the interior object proceeding from a starting position into a target position of the interior object, the adjustment is controlled electronically, and, for the adjustment process, a rough adjustment of the interior object takes place in a first adjustment range, and a precise adjustment takes place in a following second adjustment range, from an intermediate position until the target position is reached.

Embodiments of a proposed method can consequently be carried out by means of embodiments of a proposed adjustment system. Features and advantages, set out above and in the following, for embodiments of a proposed adjustment system thus also apply for embodiments of a proposed method, and vice versa.

BRIEF DESCRIPTION OF THE DRAWINGS

The accompanying drawings illustrate, by way of example, possible embodiments of the proposed solution.

DETAILED DESCRIPTION

Figure 1:
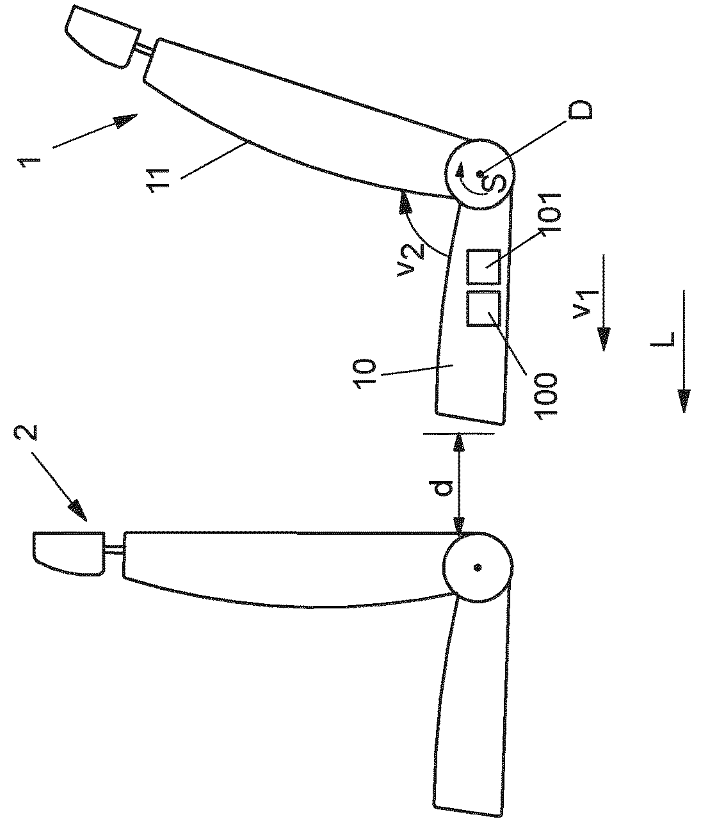
FIG. 1 is a side view of a vehicle interior of a vehicle comprising a vehicle seat which is adjusted, by means of an embodiment of a proposed adjustment system, in a first adjustment phase of an adjustment process, proceeding from a starting position, by means of rough adjustment, in the direction of an intermediate position.

FIG. 1 is a schematic side view of a vehicle interior comprising a first vehicle seat 1 which is adjustable by means of an embodiment of a proposed adjustment system. Said vehicle seat 1 is in a back seat row and is thus provided behind a front vehicle seat 2. The vehicle seat 1 comprises a seat part 10 and a backrest 11 that is pivotable relative to the seat part 10 about a pivot axis D.

The vehicle seat 1 is adjustable by means of an adjustment device 101 comprising a drive motor, optionally also a plurality of drive motors, along a longitudinal direction L. Furthermore, the backrest 11 is pivotable relative to the seat part 10 by means of the adjustment device 101, in a manner actuated by external power, along a pivot direction S, about the pivot axis D. Furthermore, optionally another adjustment along a vertical direction V of the vehicle seat 1, upwards or downwards, can also be carried out using the adjustment device 101.

The adjustment device 101 is coupled to a control electronics 100 which controls the adjustment movements of the vehicle seat 1. If a user triggers an adjustment process by a specific operating event, the control electronics 100 controls the adjustment of the vehicle seat 1 proceeding from a starting position, as is shown for example in FIG. 1, into a user-specific target position. An operating event for triggering a corresponding adjustment process can include for example a gesture, a voice command, the actuation of a switch or button, and/or a user entering the vehicle interior, which is detected by means of sensors.

In the present case, the control electronics 100 is configured to actuate the adjustment device 101 for a triggered adjustment process initially, in a first adjustment range and thus during a first adjustment phase of the adjustment process, for a rough adjustment of the vehicle seat 1, before a precise adjustment up to the target position takes place in a second, following adjustment range, and thus during a temporally following second adjustment phase of the adjustment process. In the first adjustment phase, which is sketched in FIG. 1, for example the vehicle seat 1 is adjusted along the longitudinal direction L, at an adjustment velocity, forwards $v_1$ in the direction towards the other vehicle seat 2. The adjustment along the longitudinal direction L is associated with a pivoting of the backrest 11 along the pivot direction S at an adjustment velocity $v_2$. In this case, said rough adjustment is carried out until the vehicle seat 1 is at a defined distance d from the backrest of the front vehicle seat 2. After this, the second adjustment phase then begins. In this case, the second adjustment phase begins automatically or requires a further operating event by the user, such that the adjustment process is interrupted at least briefly, until the user signals that the second adjustment phase can begin.

In the second adjustment phase, the vehicle seat 1 is then adjusted along the longitudinal direction L at a lower velocity $v_3$, over a shorter adjustment path compared with the rough adjustment. At the same time, the backrest 11 is pivoted further along the pivot direction S at a lower adjustment velocity $v_4$ compared with the adjustment velocity $v_2$, and in this case also about a smaller pivot angle than during the rough adjustment. Then, during the second adjustment phase, a height adjustment of the vehicle seat 2 along the vertical direction V optionally also takes place.

While the adjustment parameters, such as the adjustment velocities $v_1$ and $v_2$ and the adjustment paths to be bridged in the process, until an intermediate position defined by the distance d is reached, are firmly specified in the control electronics 100 or a memory of the control electronics 100, the adjustment parameters for the second adjustment phase, such as the adjustment velocities $v_3$ and $v_4$, are user-specific. In particular, said adjustment parameters which relate to the precise adjustment and thus ultimately also to the target position to be reached can already be stored in a memory of the control electronics 100, and thus can be set in a variable manner for a user or a group of users. However, data relating to the precise adjustment can also originate from an external memory, such as a memory of a mobile device of a user getting into the vehicle.

Figure 2:
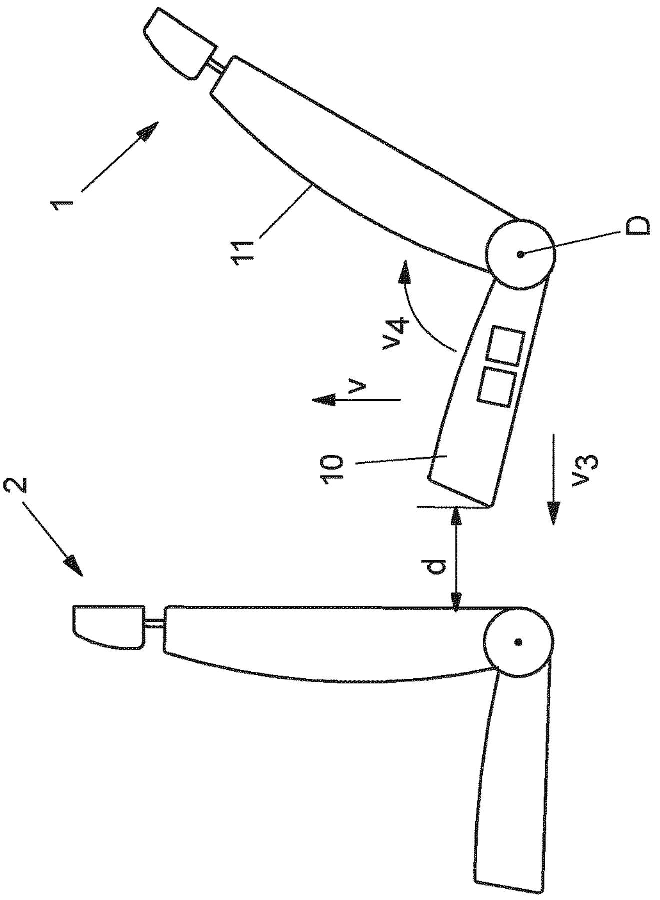
FIG. 2 is a view corresponding to FIG. 1, showing the vehicle seat during a precise adjustment proceeding from the intermediate position reached, into a target position specified on the user side.

A rough adjustment, which is carried out via the control electronics 100 and the adjustment device 101 in a manner actuated by external power, can thus serve, for a specified adjustment scenario, with adjustments over comparatively large distances and thus comparatively large adjustment paths to be bridged, for making it possible to quickly reach an intermediate position. In contrast, a subsequent precise adjustment then provides adjustments of lower velocity and a bridging of smaller adjustment paths, for example in order to purposely move an interior object in the vehicle interior as far as a user, or the user to the interior object. This can also include, in a manner deviating from the embodiment shown in FIGS. 1 and 2, the situation that, for example in an adjustment scenario of "working", during a precise adjustment a table present in the vehicle interior is moved as far as a user sitting on the vehicle seat 1 or 2, such that the user can comfortably reach a keyboard located on the table or still to be arranged thereon, taking account of user-specific characteristics, such as body height, build and/or corpulence.

LIST OF REFERENCE SIGNS

1 Vehicle seat (interior object)
10 Seat part
100 Control electronics
101 Adjustment device
11 Backrest
2 Vehicle seat
d Distance
D Pivot axis
L Longitudinal direction
S Pivot direction
V Vertical direction
$v_1$, $v_2$, $v_3$, $v_4$ Adjustment velocity

The invention claimed is:

1. An adjustment system for adjusting an interior object in a vehicle interior, comprising at least:

an adjustment device for adjusting the interior object in a manner actuated by external power, and a control electronics for controlling the adjustment of the interior object, actuated by external power, during an adjustment process proceeding from a starting position into a target position of the interior object, wherein the control electronics is configured to actuate the adjustment device for the adjustment process in a first adjustment range for a rough adjustment of the interior object, and in a following second adjustment range, from an intermediate position until reaching the target position, for a precise adjustment, wherein, in the first adjustment range and in the second adjustment range, an adjustment of at least one part of the interior object along the same adjustment direction is provided, wherein different adjustment velocities are specified for the adjustment of the interior object in the different, first and second, adjustment ranges.

2. The adjustment system according to claim 1, wherein the first adjustment range is larger than the second adjustment range.

3. The adjustment system according to claim 1, wherein the control electronics is configured to actuate the adjustment device in the first adjustment range, during a first adjustment phase of the adjustment process, for the rough adjustment of the interior object, and in the following second adjustment range, during a temporally following second adjustment phase of the adjustment process, for the precise adjustment.

4. The adjustment system according to claim 3, wherein the first and second adjustment phases follow one another automatically.

5. The adjustment system according to claim 3, wherein the control electronics is configured, after completion of the first adjustment phase, to start the second adjustment phase only in response to an operating event triggered by a user.

6. The adjustment system according to claim 5, wherein the operating event includes a gesture and/or a voice command.

7. The adjustment system according to claim 1, wherein the target position to be reached by means of the precise adjustment is user-specific and is stored in a memory of the control electronics in a manner linked to a user identification.

8. The adjustment system according to claim 1, wherein the adjustment system is configured to receive data, relating to a target position to be reached by means of a precise adjustment, from an external memory.

9. The adjustment system according to claim 8, wherein the adjustment system is configured to receive the data, relating to a target position to be reached by means of a precise adjustment, from a mobile device of a user.

10. The adjustment system according to claim 8, wherein at least one item of vehicle-specific and/or interior object-specific information is stored in the external memory, in addition to the target position to be reached.

11. The adjustment system according to claim 10, wherein the control electronics is configured to determine the target position for the interior object to be adjusted on the basis of at least one additional item of vehicle-specific and/or interior object-specific information.

12. The adjustment system according to claim 1, wherein the interior object is a vehicle seat.

13. A vehicle comprising an adjustment system according to claim 1.

14. A method for adjusting an interior object in a vehicle interior in a manner actuated by external power, wherein during an adjustment process of the interior object proceeding from a starting position into a target position of the interior object the adjustment is controlled electronically, wherein for the adjustment process a rough adjustment of the interior object takes place in a first adjustment range, and a precise adjustment takes place in a following second adjustment range, from an intermediate position until the target position is reached, and wherein at least one of:

in the first adjustment range and in the second adjustment range, an adjustment of at least one part of the interior object along the same adjustment direction is provided; and the first adjustment range is larger than the second adjustment range, wherein different adjustment velocities are specified for the adjustment of the interior object in the different, first and second, adjustment ranges.

15. An adjustment system for adjusting an interior object in a vehicle interior, comprising at least:

an adjustment device for adjusting the interior object in a manner actuated by external power, and a control electronics for controlling the adjustment of the interior object, actuated by external power, during an adjustment process proceeding from a starting position into a target position of the interior object, wherein the control electronics is configured to actuate the adjustment device for the adjustment process in a first adjustment range for a rough adjustment of the interior object, and in a following second adjustment range, from an intermediate position until reaching the target position, for a precise adjustment, and wherein the first adjustment range is larger than the second adjustment range, wherein different adjustment velocities are specified for the adjustment of the interior object in the different, first and second, adjustment ranges.

* * * * *